(12) United States Patent
Imhof et al.

(10) Patent No.: US 6,632,570 B2
(45) Date of Patent: Oct. 14, 2003

(54) FIBROUS-STRUCTURE ELECTRODE FRAMEWORK WEB STRIP, ELECTRODE PLATES PRODUCED THEREFROM AND PROCESS FOR PRODUCING A FIBROUS-STRUCTURE ELECTRODE FRAMEWORK WEB STRIP

(75) Inventors: Otwin Imhof, Nuertingen (DE); Holger Kistrup, Esslingen (DE); Karl-Ernst Noreikat, Esslingen (DE)

(73) Assignee: Deutsche Automobilgesellschaft mbH, Braunschweig (DE)

(*) Notice: Subject to any disclaimer, the term of this patent is extended or adjusted under 35 U.S.C. 154(b) by 304 days.

(21) Appl. No.: 09/778,958

(22) Filed: Feb. 8, 2001

(65) Prior Publication Data

US 2001/0053479 A1 Dec. 20, 2001

(30) Foreign Application Priority Data

Feb. 8, 2000 (DE) ......... 100 05 415

(51) Int. Cl.$^7$ ............ H01M 2/26; H01M 4/66
(52) U.S. Cl. ........ 429/235; 429/211; 429/234
(58) Field of Search .......... 442/377; 429/211, 429/234, 235, 245

(56) References Cited

U.S. PATENT DOCUMENTS

| | | | | |
|---|---|---|---|---|
| 3,793,084 A | * | 2/1974 | Marchetto | 429/40 |
| 4,301,218 A | * | 11/1981 | Benczur-urmossy | 429/42 |
| 4,439,281 A | * | 3/1984 | Schneider et al. | 29/877 |
| 5,246,797 A | * | 9/1993 | Imhof et al. | 429/211 |
| 5,395,710 A | * | 3/1995 | Imhof et al. | 429/161 |
| 5,789,097 A | * | 8/1998 | Kistrup et al. | 429/59 |

FOREIGN PATENT DOCUMENTS

| | | |
|---|---|---|
| DE | 31 42 091 C2 | 10/1981 |
| DE | 36 31 055 C1 | 9/1986 |
| DE | 36 32 351 C1 | 9/1986 |
| DE | 36 32 352 C1 | 9/1986 |
| DE | 36 37 130 C1 | 10/1986 |
| DE | 38 22 197 C1 | 1/1988 |
| DE | 38 16 232 C1 | 5/1988 |
| DE | 38 17 817 A1 | 5/1988 |
| DE | 38 17 817 C1 | 5/1988 |
| DE | 38 17 826 C2 | 5/1988 |
| DE | 38 22 209 C1 | 7/1988 |
| DE | 39 35 368 C1 | 10/1988 |
| DE | 38 43 903 C1 | 12/1988 |
| DE | 39 25 232 C1 | 7/1989 |
| DE | 40 04 106 C2 | 2/1990 |
| DE | 40 10 811 C1 | 4/1990 |
| DE | 40 18 486 C2 | 6/1990 |
| DE | 40 33 518 C1 | 10/1990 |
| DE | 40 40 017 C2 | 12/1990 |
| DE | 41 03 546 C2 | 2/1991 |
| DE | 41 04 865 C1 | 2/1991 |
| DE | 41 06 696 C1 | 3/1991 |
| DE | 42 16 966 C1 | 5/1992 |
| DE | 42 25 708 C1 | 8/1992 |
| DE | 42 35 884 C1 | 10/1992 |
| DE | 42 42 443 C1 | 12/1992 |
| DE | 196 27 413 C1 | 7/1996 |

* cited by examiner

Primary Examiner—Patrick Ryan
Assistant Examiner—Tracy Dove
(74) Attorney, Agent, or Firm—Crowell & Moring LLP

(57) ABSTRACT

A fibrous-structure electrode plate has a metal thickness which increases continuously towards the current discharge lug and the resultant low-loss current carrying. To produce the fibrous-structure electrode framework plates according to the invention, textile substrate can be reinforced by electrodeposition. For the subsequent use of the textile substrate which has been reinforced by electrodeposition as an electrode framework of fibrous structure, a diaphragm system is introduced into the electrodeposition bath between each anode and the premetallized web of a textile substrate which is to be reinforced by electrodeposition. In this way, it is possible to distribute the metal applied to the substrate, specifically without previously cutting the web to size.

27 Claims, 3 Drawing Sheets

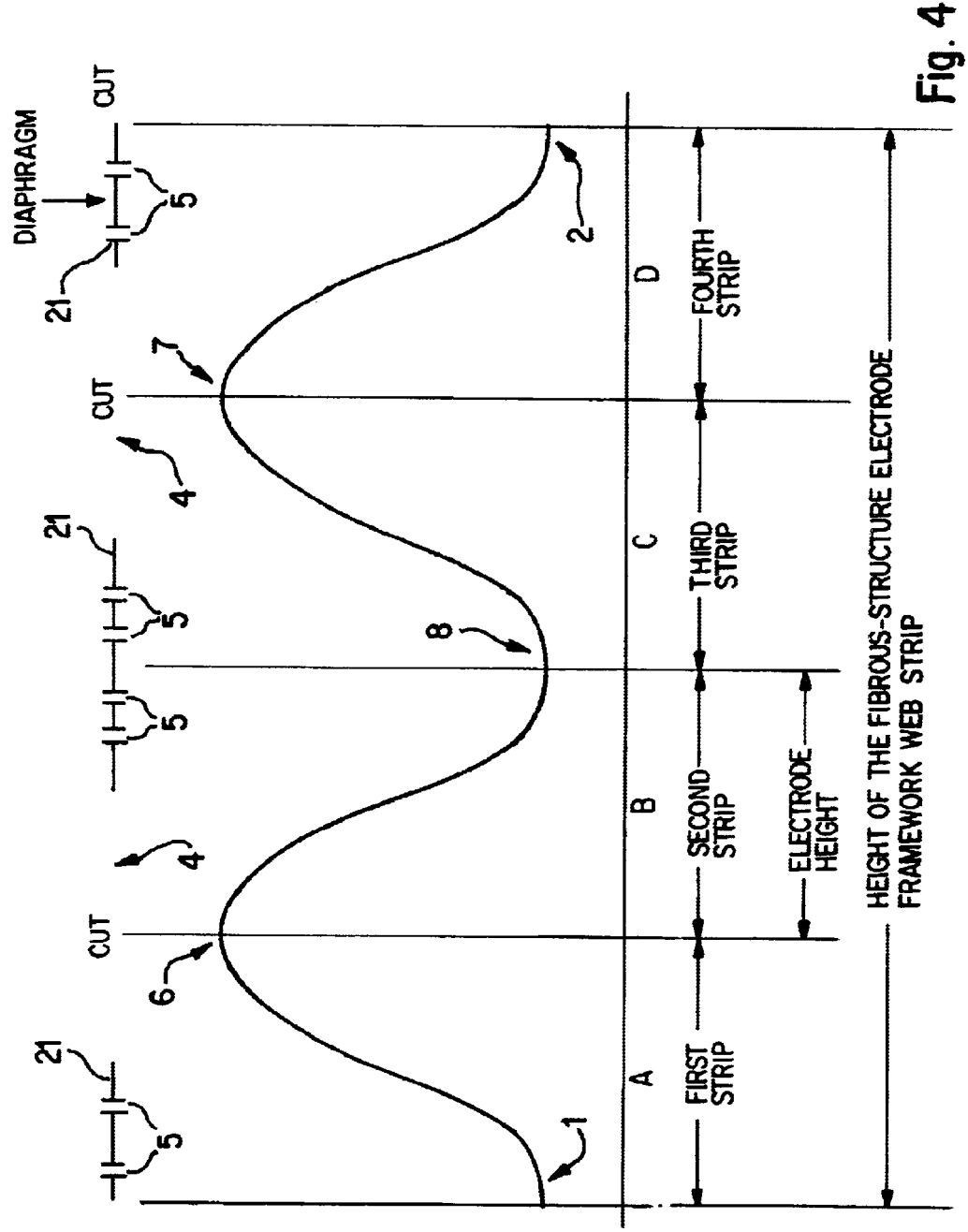

FIBROUS-STRUCTURE ELECTRODE FRAMEWORK WEB STRIP, ELECTRODE PLATES PRODUCED THEREFROM AND PROCESS FOR PRODUCING A FIBROUS-STRUCTURE ELECTRODE FRAMEWORK WEB STRIP

BACKGROUND AND SUMMARY OF THE INVENTION

This application claims the priority of German patent document 100 05 415.3, filed Feb. 8, 2000, the disclosure of which is expressly incorporated by reference herein.

The present invention relates to a fibrous-structure electrode framework web strip, electrode plates produced therefrom and a process for producing a fibrous-structure electrode framework web strip.

For about 17 years, a new type of electrode frameworks has been in use industrially in the field of electrode technology for alkaline and acid storage batteries, namely the fibrous-structure electrode type. Fibrous-structure electrodes are distinguished by the fact that, unlike, for example, sintered electrodes, pocket-plate electrodes or even lead-grid electrodes, to hold the active compound they have a porous framework for the current discharge and fixing the active compound, instead of purely metallic holding or conductor elements. The porous framework is produced by chemical and subsequent electrodeposition metallization of a nonconductive plastic substrate of fibrous structure.

Storage batteries for storing electrical energy in the form of chemical energy which can then be extracted again as electrical energy were known as long ago as the end of the nineteenth century. Even today, the lead storage battery is in widespread use. In this battery, the electrodes or plates consist of the active material, which is the actual energy store, and a lead support (grid) which accommodates the active material. For some time, there have been storage batteries with a new type of electrode in which the framework has a fibrous structure. There is extensive known prior art for this type of electrode.

For example, German patent document DE-C 40 04 106 describes a metallized plastics-fiber electrode framework based on a nonwoven for battery electrodes with increased load-bearing capacity. German patent documents DE-C 36 31 055, DE-C 36 37 130, DE-C 38 43 903, DE-C 39 25 232, DE-C 41 06 696, DE-C 40 33 518, DE-C 42 42 443, and DE-C 196 27 413 have described the activation and chemical metallization and suitable processes, and German patent document DE-C 42 16 966 has described a process and an apparatus for the electroplating of nonwoven and needled-felt webs. The fundamentals of the electrodeposition of metal are described, by way of example, in Dettner-Elze: Handbuch der Galvanotechnik, Volume I/1, pp. 136 ff., C. Hanser Verlag Munich (1963) und in "Die galvanische Vernickelung" [The Electrodeposition of Nickel], from Galvanotechnik, editor: Professor Robert Weiner; Eugen G. Leuze Verlag, Saulgau/Württemberg.

German patent documents DE-C 38 17 817, DE-C 38 17 826, DE-C 40 10 811 and DE-C 42 35 884 specify aqueous nickel hydroxide and/or cadmium oxide pastes for the vibratory filling of foam- and fibrous-structure electrode frameworks.

German patent document DE-C 38 22 209 has disclosed a device for the vibratory filling of porous electrode frameworks, and German patent document DE-C 38 22 197 has disclosed a process for the quasi-continuous filling, and German patent document DE-C 38 16 232 a process for the vibratory filling, of foam- or fibrous-structure electrode frameworks. German patent document DE-C 38 22 197 also includes cleaning excess paste off the electrode framework after the mechanical impregnation, preferably using brushes. German patent document DE-C 40 18 486 has disclosed a process for the production of fibrous-structure electrodes in which the framework, which has been calibrated prior to the mechanical impregnation, is calibrated again after the filling operation by being compressed over its entire surface. German patent documents DE-C 40 40 017 and DE-C 41 03 546 each describe a process for filling fibrous-structure electrode frameworks provided with current discharge lugs for storage batteries containing an active-compound paste with simultaneous calibration of the framework, in which in the first case the framework is rolled during the filling operation and in the second case the framework is pressed during the filling operation.

The technical teaching relating to the welding of current discharge lugs of various designs to a fibrous-structure electrode framework of the type described is listed in the German patent documents DE-C 42 25 708, DE-C 41 04 865, DE-C 39 35 368, DE-C 36 32 352, DE-C 36 32 351, DE-C 31 42 091.

The above compilation, which in no way claims to be complete, shows that fibrous-structure electrode technology is a field which is currently the subject of intensive work. In practice, there are nevertheless constantly recurring difficulties and inadequacies during the production of fibrous-structure electrode frameworks, in particular relating to the process steps of activation, metallization, reinforcement by electrodeposition, filling with active compound and cleaning off the excess paste after the filling operation. Such difficulties and inadequacies may have an adverse effect during assembly of the filled, dried fibrous-structure electrodes, the unfilled nickel-fiber frameworks in the case of FNC recom cells and the separators in the case of gastight or open Ni/Cd cells of narrow design. On the other hand, such adverse effects may emerge only when the cells are operating, on account of the constantly changing volume work of the electrodes (primarily the positive electrodes in this system) resulting from the charging and discharging, so that, for example, the separators fitted are in certain zones exposed to excessive loads.

The activation and the subsequent metallization of plastics-fiber frameworks and the subsequent electrodeposition surface treatment of the various substrates are by now sufficiently well known. The technique involving deposition of metal alloys or of individual metals on the surface of substrates is used primarily if the layer which is to be electrodeposited is to impart certain properties, such as electrical conductivity, shine, reflectivity, chemical resistance, etc., to the treated substrate which the substrate itself does not have to a sufficient extent.

Now that, in practice, an ever increasing range of substrates made from plastic fibers is being used for a very wide range of applications, an electrodeposition surface treatment has become customary for these substrates as well, not only for substrates which themselves have metallic properties. For this purpose, the electrically nonconductive plastics surfaces are initially "activated" by the deposition of a catalytically active substance, and are then "metallized" by chemical means. Therefore, the electrically nonconductive plastics surfaces are provided with a metallic coating which is then suitably reinforced by electrodeposition of the same metal and/or a different metal. The application of the above technology to textile woven fabrics, nonwovens, needled felts or open-pore foams has opened up completely new application areas for these materials.

The subsequent electrodeposition surface treatment of metallized substrates has hitherto been carried out in such a way that the substrate which is to be electroplated, in a plurality of strips arranged above one another, is applied to a plurality of electroplating stands arranged next to one another—spatially close together—and the electroplating frame is clamped in place by the movable upper parts. The substrate is connected to the electroplating stand with sufficient electrical conductivity. Other than at the contact points with the substrate, the electroplating stand has an insulating layer over the rest of its surface. In this arrangement, an electroplating stand is fitted with a plurality of substrate strips and, at the same time, a plurality of electroplating stands next to one another in one electroplating tank are fitted with continuous premetallized substrate strips.

After the immersion of the electroplating stands which bear the substrate webs and after the electroplating process, metallized fibrous-structure framework strips are then formed. To obtain a reinforced edge, as is described in principle in German patent document DE-C 31 42 091, for the subsequent welding of current discharge lugs onto the rigid metallized fibrous-structure framework strips, it is known from German patent document DE-C 42 16 966 (also visible from FIGS. 1 and 2) that a sufficient clear spacing of approximately 80 mm to 100 mm from the next substrate web or from the transverse reinforcements of the electroplating stands must be maintained at those edges of the inserted premetallized substrate webs at which reinforced edges are subsequently to be formed during the electroplating process.

It can also be seen from the abovementioned figures that, to achieve optimal utilization of the height of the electroplating tank, the frame stands are supplied in such a way that an upper part of the frame stands holds a substrate web which is twice as wide as that in the lower part of the frame stands. As a result of the clear distances described, a reinforced edge is formed on the upper clamped-in substrate web at both the upper edge and the lower edge, while on the lower clamped-in substrate web, which is only half the height of the upper substrate web, a reinforced edge is formed only on the lower edge, since transverse struts of the electroplating frame stands are situated directly against its upper side. As a result of the spaces, the free edges of the fibrous-structure electrode framework webs are metallized more intensively, the textile felt web thickness being widened in these regions as a result of a high level of metal being deposited. After the electroplating, the frame stands are removed from the electrolyte in the electroplating tank, washed in a dedicated station and mechanically separated into individual plates. As a result, twice as many individual plates are formed from the upper substrate web as from the lower substrate web of the example described above.

German patent document DE-C 42 16 966 discloses that, after the fibrous-structure framework strips have been mechanically separated into individual plates, fibrous-structure framework electrode blanks are formed; the edge of such blanks that has a high level of nickel is not at right angles to those sides of the blanks which have been sawn, cut or machined in some other way. Thus, considerable effort is required to clamp the activated and chemically metallized fibrous-structure framework webs into holding frames which are arranged in addition to the electroplating stands and are equipped with inner and outer needle strips that have provided needles in portions thereof. Only with such considerable effort is it possible for the edge having a high level of nickel to be inserted, and clamped by the outer, rotatable needle strips, in such a way that the upper and lower edges of the fibrous-structure webs run in a straight line prior to and during the electroplating, such that the structure webs do not exhibit any irregularities in the web. As a result, after the mechanical separation of the fibrous-structure framework strips into individual plates, it is possible to obtain fibrous-structure framework electrode blanks, of which the edge that has a high nickel level is at right angles to the sides of the blanks which have been sawn, cut or machined in some other way. In this type of design of a reinforced edge, nickel agglomerates (so-called "dendrites"), are formed at marked locations on the premetallized substrate web, inter alia at the fiber ends or individual projecting fiber tips. The size of these undesired dendrites is dependent on the operating program of the electroplating (increasing the current, current level), which in turn is dependent on the nickel level to be achieved in the fibrous-structure electrode (low, medium, high or extra-high load cell types). In some cases, however, they may extend in the longitudinal direction up to 8 mm to 10 mm, with maximum cross section of up to 5 mm.

In the second column, lines 41 to 43, German patent document DE-C 42 16 966 states that these dendrites are removed from the fibrous-structure electrode blanks in a subsequent production step. Their mass is therefore missing from the overall balance for the mean nickel level in the electrode. The application of nickel to the fibrous-structure electrode is not uniform over the entire electrode height. In the region of the lug attachment, an area of the reinforced edge extending at most approximately 3 mm over the electrode height, has a nickel level which is about three times that which exists on average over the entire electrode. Therefore, the reinforced edge of the framework is the most dimensionally stable part. After the fibrous-structure electrode blanks have been cut to size, they are welded to the current discharge lugs.

During manufacture, it has often turned out that, in a first operation the portion of the dendrites (which grow in the shape of a mushroom over the entire length of the upper edge), that projects over the front principal face of the fibrous-structure electrode framework is ground off; and in a second operation that portion which projects over the back principal surface of the fibrous-structure electrode framework is ground off. To improve handling of the fibrous-structure framework from a technical standpoint, during these working steps some of the dendrites which project over the upper side along the length of the edge are also included, since in the two working steps mentioned the operator inclines the fibrous-structure framework individually more or less steeply when passing through the length of the upper fibrous-structure framework edge while grinding off dendrites. In some cases, a further working step is performed, in which the residual portion of dendrites that project beyond the upper side along the length of the reinforced edge of the fibrous-structure electrode framework is also ground off. This working step depends heavily on having a skilled and reliable operator with a good eye for his work, since every inherently inhomogenous edge which is to be machined is of a different nature.

In order to avoid excessive removal of material from the reinforced edge at local areas along the length of the reinforced edge, work is generally performed in such a way as to err on the side of leaving too much material in place. That is, in recesses along the length of the reinforced edge, some of the dendrites are left in place, even up to a height of 2 to 3 mm. Also, at elevated sections along the length of the reinforced edge, the dendrites are left in place up to a height of from 0.2 mm to 0.5 mm.

If a circular indexing machine is used together with an associated welding unit to weld current discharge lugs onto fibrous-structure electrode frameworks that have been pretreated in this way (and have been cut to size in terms of width), in order to locate the fibrous-structure electrode framework on the inserted current discharge lug prior to welding, a region of the upper edge of the fibrous-structure electrode framework which is to be welded has to be used for positioning. If residues of dendrites are present in this region for the stop or if there are no residues of dendrites at other frameworks, during the welding operation the upper edge of the fibrous-structure electrode framework comes to lie farther up or down on the current discharge lug. As a result, the optimum positioning of the framework on the bevelled face of the current discharge lug, or the bevelled faces of the teeth of the current discharge lug, is influenced; therefore weld joints with scattered strength values are formed.

For optimum welding, the upper welding electrode or the mount for the fibrous-structure electrode frameworks on the turntable would have to be readjusted according to the form of the upper, machined edge of the fibrous-structure electrode framework. To obtain accurately dimensioned fibrous-structure electrodes, for the reasons mentioned above, the lower edge of the fibrous-structure electrode is cut only in a further operation following welding, in order to ensure that the entire height of the fibrous-structure electrode, including the welded-on current discharge lug, lies within the specified dimensional tolerances.

Furthermore, if the dendrites are not machined off in a separate operation, experience has shown that during the welding of the fibrous-structure electrode framework to the current discharge lug it is impossible for all the dendrites on the reinforced edge of the electrode framework to be included. Unwelded dendrites, however, may lead to disruptive short circuits, possibly even causing failure when the cell is subsequently operating.

On account of the inhomogeneity, of nickel-plated fibrous-structure electrode framework with a width of up to 180 mm, and the even less homogenous edge with a high level of nickel and dendrites which in some cases have been subsequently removed from the surface in a separate working step, single-spot resistance welding is preferred in some regions—generally in regions around the centre of the weld seam length. But in other regions—generally starting from one or both edges (outer sides of the fibrous-structure electrode frameworks) resistance-welding achieves improved bonding. Thus, in the latter regions, in the event of transverse forces, the current discharge lug can in some cases be peeled off the fibrous-structure electrode framework over the entire welded area. These circumstances are particularly common when processing relatively thin fibrous-structure electrode frameworks with a nominal thickness of 1.5 mm and with relatively low nickel levels in the fibrous-structure electrode framework.

On account of the abovementioned inhomogeneities in the fibrous-structure electrode framework, regions in which the contact is produced first and at a relatively high pressure (good contact; main welding current path) and regions in which the contact is produced later and at a low pressure (less favorable contact; auxiliary welding current path) are established over the weld seam length during the welding operation, so that it is no longer possible to achieve optimum welding conditions. The welding operation (at the high temperatures which occur) is made more difficult by the melting and evaporating plastics material, which emerges from the nickel-plated fibers.

The best current transfer is achieved at those locations in the weld zone at which the fibrous-structure electrode framework has the highest accumulation of nickel. If there is a non-uniform distribution of the nickel at the reinforced edge on account of the formation of dendrites during the electrodeposition of nickel, it is impossible to achieve a uniform distribution of current over the entire weld length when the current discharge lug is connected to the fibrous-structure electrode framework during a welding operation. This effect is heightened by the non-uniform pressure distribution during the operation of welding an inhomogenous framework edge over the entire weld length.

The welding pressure of the welding electrodes is consumed at those locations in the welding zone at which once again the highest mass accumulation of nickel is present. Thus, it is here that the strongest weld joints are formed. The remaining weld regions are adversely affected, so that in these regions there is only a residual amount of energy available for each welding, and under certain circumstances this energy may even no longer be sufficient to heat the current discharge lug and the fibrous-structure electrode framework in this zone to temperatures above their melting point. These phenomena may be intensified if the welding electrodes are not oriented parallel to one another. Also, the fibrous-structure electrode framework must not slip at the last moment while the welding electrodes are being brought together during the welding operation, and must have a straight edge profile.

If there are crooked and/or curved reinforced edges on the fibrous-structure electrode plates which are separated from the framework strip, single-spot welding to the current discharge lug yields a joint which holds only over a welding width of 70% or even less. Over the remaining 30% or more of the welding width, the upper welding electrode simply fails to include the fibrous-structure electrode framework, since in these regions, on account of the inclination or curvature of the upper edge, it is not in contact with the current discharge lug at all.

It is also possible that, after welding, some of the framework may spring off the current discharge lug, since it has only been adhesively bonded. (There has been no welding of the reinforced edge in this zone on account of the pressure conditions during the single-spot welding having changed.) Fibrous-structure electrodes of this type which have been badly pretreated for the welding operation and provided with a current discharge lug tear when subjected to the loads involved in vibratory filling with active paste, in stripping or in brushing off the paste after the impregnation.

German patent document DE-C 42 25 708 discloses that, on account of a current discharge lug that is formed on the weld-on end of teeth which are spaced apart from one another by teeth spaces, some of the inhomogeneities of the reinforced edge which have been outlined above are evened out (specifically in those regions of the weld length at which tooth gaps lie opposite the fibrous-structure electrode framework). At the other regions of the weld length, at which teeth of the current discharge lug lie opposite the fibrous-structure electrode framework during the welding operation, the inadequacies outlined above apply to the sum of the length of all the teeth sections of the current discharge lug.

Due to the high gradient (that is, a sudden increase/decrease) of the nickel deposition in the edge region in the fibrous-structure electrode framework, there is a high level of scrap involved in resistance welding of the joint between the fibrous-structure electrode framework and the current discharge lug. When the joint between fibrous-structure electrode framework and the current discharge lug is subjected to mechanical loads, such as for example during the vibratory filling with active paste, as is known from the prior art (e.g., from German patent document DE-C 38 22 197), scrap occurs—with some of the fibrous-structure electrode frameworks tearing away from the respective welded-on current discharge lug—specifically immediately below the weld zone. Thus, a framework strip of approximately 2 to 5 mm which is secured in the welding bed remains on the current discharge lug over the width of the current discharge lug. Such damage at this preferred location over the lug width is also attributed to the fact that the fibrous-structure electrode framework is weakened, on account of the heating which takes place as a result of the welding operation, with associated local evaporation of the plastics core of the nickel-plated fibers, in addition to being constricted (the cross section being reduced by the welding operation).

Current fibrous-structure framework electrodes, in which, outside the reinforced edge over an area of up to 5 mm, the nickel level is approximately constant over the height of the remaining fibrous-structure electrode framework, apart from undesirable manufacturing fluctuations of the order of magnitude of a few per cent, cannot satisfactorily fulfil the two principal functions demanded of them (namely taking up current from the active compound with minimum possible losses and subsequently carrying current to the current discharge lug). The extent to which they are able to fulfill these functions deteriorates as the operating loads imposed on the storage batteries constructed using these electrodes increase.

This will now be explained in more detail: one of the essential functions of the fibrous-structure electrode framework is to accommodate and hold the active compound in its interior, and to take up the energy which is released in the interior of the fibrous-structure electrode, in the form of a current, as a result of an electrochemical reaction when the storage battery is operating. In the case of storage electrodes, contact between the active compound, which often has a low conductivity, and the nickel-plated fibers of the fibrous-structure electrode framework, which have a good conductivity, must be as intimate as possible, and of a good quality at numerous locations. The porous, three-dimensional structure of the fibrous-structure electrode complies with this requirement.

Another function of the fibrous-structure electrode framework is to carry the current from all regions of the fibrous-structure electrode framework, out of the interior of the electrode, via the electrode current discharge lug, the strap leading to the cell pole, to the outside, with minimum possible losses. That is, it must conduct current just as well from the bottom region as from the middle region or the top region over the entire height of the fibrous-structure electrode. A three-dimensional, highly porous, electrically conductive structure with an approximately constant nickel level over the fibrous-structure electrode height is relatively unsuitable for this function. This adverse property is attributable simply to the design of the fibrous structure, which is generally as homogenous as possible; thus, the conductivity of the metallized fibrous-structure electrode framework is approximately identical in all three directions (the height, the width and the thickness of the framework). The fact that the current discharge lug, in the case of electrodes for storage batteries with prism-shaped housings and relatively large capacities, is preferably situated at the upper edge of the electrode means that the current is preferably carried from the bottom upwards in the electrode. Thus, in statistical terms primarily only this direction of conductivity is used for carrying current in the highly porous fibrous-structure framework. Over this height of the framework, which in low cell types is 160 mm and in high cell types is 240 mm, the conduction of current involves high levels of losses, since the conductivity in the direction under consideration is constant on account of the nickel level of the fibrous-structure framework likewise being constant.

A previously existing reinforced edge is so dimensionally stable that it temporarily inhibits successful performance of, for example, continuous production steps during washing and drying of the framework strips as a whole following the electroplating.

One object of the invention is to provide a metallized fibrous-structure electrode framework and a process for the electroplating of activated and metallized plastic substrates which avoids the drawbacks outlined above, both during production and during the use.

In particular, during the electroplating process a reinforced edge that extends only up to approximately 3 mm into the interior of the electrode framework should not be created; rather a metallized fibrous-structure electrode framework with a nickel level that varies gradually over the electrode height is to be formed during the electroplating by means of suitable internals (diaphragms of particular design) in the electroplating tank. The anodic nickel which was deposited in the previous reinforced edge in the form of dendrites is to be dispensed with.

The creation of fibrous-structure electrode frameworks without dendrites means that dendrites do not have to be removed subsequently in a dedicated operation (thus avoiding the formation of hazardous dusts which are harmful to health, and saving costs). Also, because they are not machined off, they cannot lead to disruptive short circuits when the cell is operating. A particular design of the internals in the electroplating tank is to ensure only one premetallized fibrous-structure web has to be inserted into the stand frames, secured, removed after the electroplating process, centrifuged and washed, and this web is then cut, stamped or divided in some other way into identical fibrous-structure electrode framework blanks over the height and width of the web.

Another object of the invention is to provide a fibrous-structure electrode framework which, for use in a storage battery, has a lower nickel level in its lower region than in its middle region, and the highest nickel level in its upper region (the zone in which it is subsequently welded to the current discharge lug), so as to ensure suitable conductivity for the active compound over all regions of the electrodes, as seen over the height (in total), and so that the current can be carried to the current discharge lug with relatively low losses.

In addition, the entire web, at those regions in which it is subsequently divided into the individual fibrous-structure framework strips, is equipped over a relatively large region with a constant nickel level. Thus, during such division, correctly dimensioned, straight edges are always formed in the fibrous-structure framework plates before the current discharge lug is welded on, with the upper edge and lower edge, and also the right-hand and left-hand edges of the fibrous-structure electrode framework running parallel to one another, and with the upper and lower edges running at right angles to the side end edges.

Another important object of the invention is to provide, in the upper region, a zone with a nickel level that is sufficiently high it is possible to reduce the scrap rates when the fibrous-structure electrode frameworks are welded to the current discharge lugs. In this context, it is necessary to achieve a high nickel level even in the interior of the fibrous-structure framework and over a zone extending from its upper weld-on edge which is advantageously longer than the weld-on zone, so that weakening of this zone caused by evaporation of the plastic cores of the nickel-plated fibers during the welding operation can be compensated for compared to the prior art, through connection of the fibrous-structure electrode framework to the current discharge lug.

Another object is to produce a nickel level, over the entire height, width and thickness of the fibrous-structure electrode framework and particularly, in the bottom region of the framework (the zone with the lowest nickel level of the fibrous-structure electrode framework), which is sufficiently high that the framework, even in bottom region, is strong enough to withstand the paste pressure which exists during the filling with a pasty, active compound, by whatever method (vibratory shaking, rolling-in or pressing-in with simultaneous calibration of the framework), such that the paste penetrates into the pores without problems and with simultaneous displacement of the air therein and does not compress and compact the fibrous-structure electrode framework in the manner of a sponge during the filling operation when it is pressed out.

A further object of the invention is to fabricate a fibrous-structure electrode framework from metallized plastic fibers with welded-on, thick current discharge lug comprising teeth which are spaced apart from one another by teeth spaces, in which i) there is no cracking in the fibrous-structure electrode framework in the vicinity of the weld joint, ii) the fibrous-structure electrode framework does not have to be stamped in the welding region prior to the welding, and iii) over all partial sections of the welding length (sum of the teeth widths at the level of the welding-on line) there are uniform pressure distribution and uniform current distribution during the welding, and contact regions and contacts which are always identical are created at regular intervals.

The weld joint is to be achievable using single-spot welding over a fibrous-structure electrode framework width of up to 200 mm and is to have scrap rates during the welding operation of below 1% even for thin frameworks (1.5 mm nominal thickness). The weld joint between the fibrous-structure electrode framework according to the invention and the current discharge lug is to have a high strength (not only under tensile load but also in the transverse direction, and not only in preferred weld regions but also in the edge zones). This enables fibrous-structure electrodes with welded-on current discharge lugs to be produced with favourable electrical contact resistances and high service lives, so that they can be used not only in storage batteries in stationary installations, but also in industrial trucks or underground trains or similar applications involving vibrating loads.

These and other objects and advantages are achieved by the invention, in which the activation and chemical metallization of the plastics frameworks (in particular felts, needled felts or nonwovens) is in practice carried out using known techniques. Suitable materials for the fibers include the plastics materials which are also suitable for textile substrates, e.g., polyolefins, polyamides, poly-acrylonitrile, etc., provided that they are stable with respect to the electrolyte.

The procedure indicated can be used in particular for the electroplating of pretreated structure webs made from nonwoven or needled felt which have a web thickness of from 0.25 mm to 5.00 mm, a porosity of the untreated web of from 50% to 98%, and a basis weight of the untreated web of from 50 g/m$^2$ to 800 g/m$^2$, the plastics fibers of the web having a diameter from 0.7 dtex to 7.9 dtex, with a staple length of the plastics fibers of from 15 mm to 80 mm. The electroplating operation is preferably carried out until the structure webs have been coated with a layer of nickel or copper of on average from 50 mg metal/cm$^2$ to 300 mg metal/cm$^2$.

According to the invention, following the production of a cohesive, premetallized fibrous-structure framework web, without prior cutting of strips to electrode height, the entire web is clamped into electroplating stands. It is then introduced into the electrolyte bath, and reinforced by electrodeposition in the bath. During the electrodeposition of metal, a rigid diaphragm system is introduced between each of the anodes and the premetallized fibrous-structure framework web (which is connected as cathode). Taking into account the electroplating bath dimensions, the introduction of the diaphragm system leads to alternating formation of strips with a graduated nickel level over the height of the web, with the strip height corresponding to the subsequent fibrous-structure electrode framework height. Each strip has a zone with a high, medium and low nickel level.

After completion of electrodeposition and removal of the electrolyte from the pores of the fibrous-structure electrode framework web, it is cut to size (to electrode height) in such a manner as to create strips, each of which extends (heightwise) from a zone with the highest through a zone with the lowest nickel level. The strips are subsequently separated into electrode width.

Other objects, advantages and novel features of the present invention will become apparent from the following detailed description of the invention when considered in conjunction with the accompanying drawings.

BRIEF DESCRIPTION OF THE DRAWINGS

FIG. 4 shows the nickel level over the height of a fibrous-structure electrode framework web strip which can be divided into four strips, each strip height corresponding to a fibrous-structure electrode framework plate height to be produced.

DETAILED DESCRIPTION OF THE DRAWINGS

Figure 1:
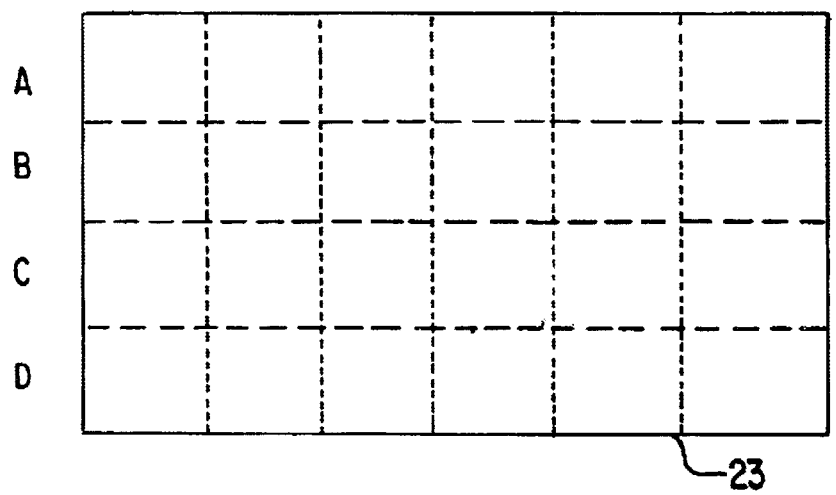
FIG. 1 is a plan view of a fibrous structure framework web, which is divisible into strips A–D, according to the invention.
Figure 2:
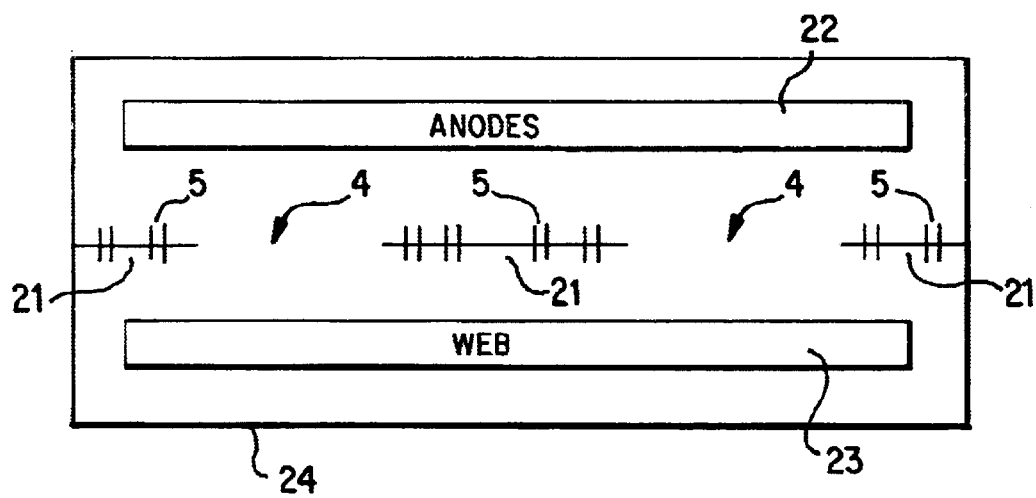
FIG. 2 show sthe fibrous structure framework web immersed in an electroplating bath having diaphragms according to the invention.
Figure 3:
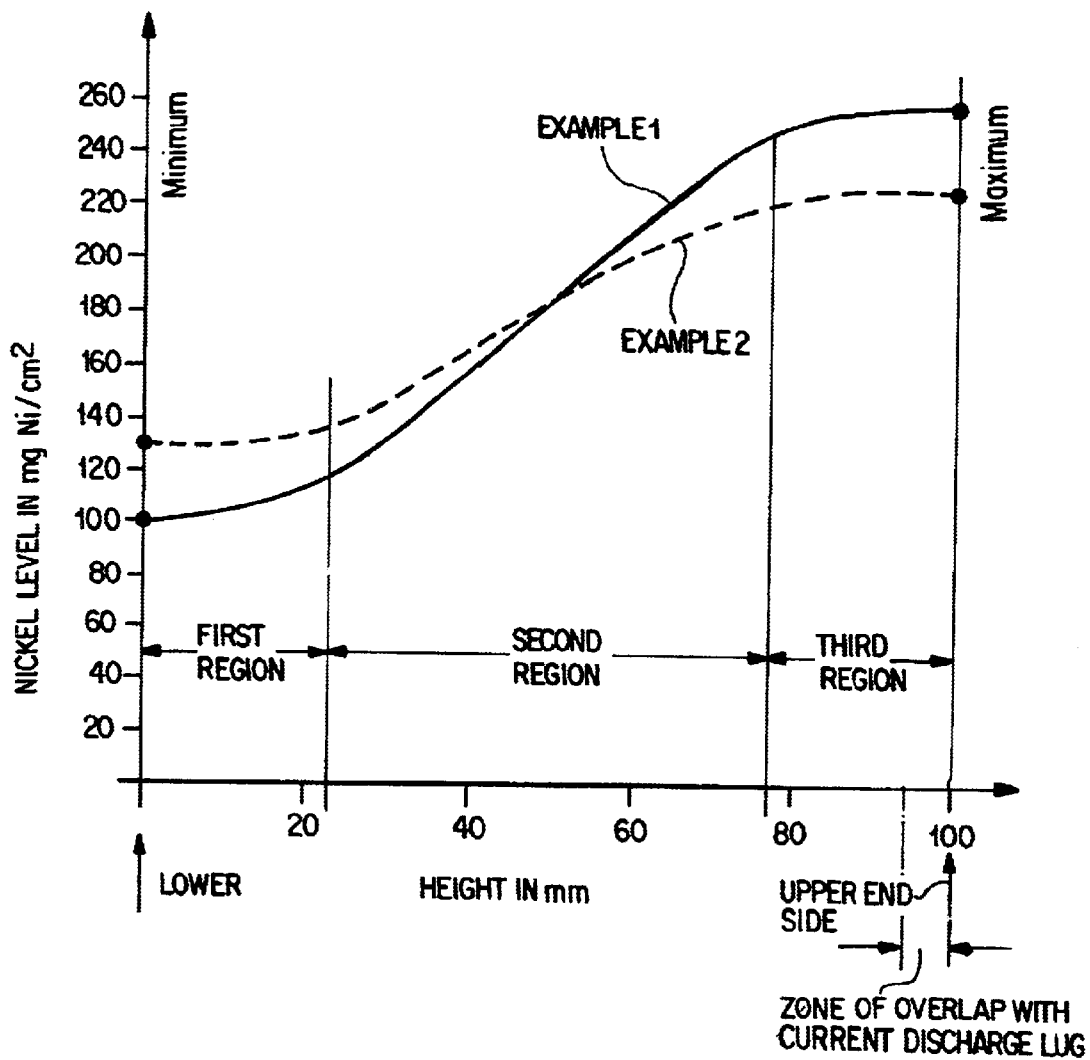
FIG. 3 shows two examples of the nickel level over the height of a fibrous-structure electrode framework produced according to the invention.

As shown in FIGS. 1–4, it is possible to produce a specific number of subsequent fibrous-structure framework strips A–D over the web height (FIG. 1), according to the total electroplating bath height (shown schematically in FIG. 2) and the height of the format to be produced. To simplify the geometry of the diaphragms, the strips A–D are produced in the web in such a way that the zone with a high nickel level of the first (top) strip A in turn adjoins the zone with a high nickel level of the second strip B, and the zone with the low nickel level of the second strip B adjoins the zone with the low nickel level of the third strip C, etc., as shown in FIG. 4. The top zone 1 of the top strip of the web and the bottom zone 2 of the last strip of the web advantageously have a low nickel level, as shown in FIG. 4. It is then possible to produce an even number of strips from the web.

The diaphragms (21 in FIGS. 2 and 4) are positioned over a large area between the respective anodes 22 (shown schematically in FIG. 2) and the fibrous-structure framework web 23 which is to be nickel-plated, and have large, continuous openings 4 in those zones in which the most heavily plated portions of two fibrous-structure electrode framework strips (maximum nickel level) meet. In those portions in which the lower zones of two fibrous-structure electrode framework strips (minimum nickel level) meet, the diaphragms are continuous and have small openings 5 of from 5 mm to 10 mm at a spacing of from 20 mm to 30 mm, depending on the format height of the fibrous-structure electrodes to be produced. The zones 6, 7 with a high nickel level are formed behind a large opening in the diaphragm system. The zones with a low nickel level are formed adjacent the small openings 5 in the otherwise closed diaphragm system. The small openings have proven necessary so that zones with an insufficient nickel level are not formed in these regions.

At a distance up to the respective diaphragm systems, the top and bottom edges of the entire web are covered, so that it is impossible for any areas to form at these edges with such an undesirably high nickel level that dendrites are formed. The fact that the nickel level is constant at the seams of the strips (maximum or minimum nickel level) means that, even in the event of a low (but inevitable) manufacturing tolerance when the strips and the individual plates are being cut to size, the same, desired nickel level is always established on their upper and lower edges. Moreover, the entire web can thus be divided into strips without the formation of waste strips (losses), and all the strips formed are dimensionally accurate. Preferably, a slight excess is provided at the top and bottom edge of the premetallized fibrous-structure framework web, for clamping reasons, in order to be able to compensate for any manufacturing tolerances.

A controlled flow is provided in the electroplating tank, with a significant component directed onto the principal surface of the fibrous-structure electrode framework strip during the electroplating. This technique ensures that, during the electroplating, the concentration of nickel ions in the electrolyte in the interior in the pores of the framework does not become excessively depleted, over the entire principal surface of the web. In this manner, it is also possible to eliminate the scrap which occurs in particular in the case of thick fibrous-structure framework webs with a nominal thickness of 3.5 mm or 4.5 mm on account of a sandwich-like construction of the nickel-plated framework, in which only the outer layers have been nickel-plated correctly while in the interior the premetallized fibers have not been reinforced. The fact that a regular deposition of metal of this type in porous, premetallized substrates is possible, even with relatively high substrate thicknesses, despite the introduction of a rigid diaphragm system according to the invention and the resultant effect on the electrolyte flow in the electroplating bath, is a positive result which could not be expected by the person skilled in the art.

The area of the anodes corresponds to the free area of the premetallized fibrous-structure framework web.

If, on account of the production of different formats in a single electroplating bath, the anodes are set up for the largest format to be produced, during the production of smaller formats (or multiples thereof) the remaining anode surface is covered with respect to a now smaller opposite free surface of the premetallized fibrous-structure framework web.

Since, in the invention, a fibrous-structure electrode framework having a reinforced edge that is free of dendrites is formed, the resistance welding of fibrous-structure electrode framework and current discharge lug yields a joint in which overall a uniform pressure distribution is achieved over the entire length of the weld seam, not just in randomly distributed, preferred regions over the weld seam length (where in previous known fibrous-structure frameworks with a reinforced edge the highest proportion of dendrites or residual dendrites are present at the edge with a high nickel content). Rather, such uniform pressure distribution is achieved over all the partial sections of a current discharge lug comprising teeth spaced apart from one another by teeth spaces. Thus, overall there is also a uniform current distribution through contact regions which are always to be acted upon identically over the corresponding teeth and contacts at regular intervals during welding, on account of a homogenous fibrous-structure electrode framework in the weld-on region. This leads to improved mechanical stability of the weld joint under both tensile and flexural loads.

The invention is explained below with reference to examples, without the specifications or properties mentioned therein in any way restricting the application of the invention. Rather, these examples serve only to demonstrate possible applications of the invention idea.

EXAMPLE 1

An electroplating bath with a capacity of 70 l was filled with an electroplating electrolyte for the electrodeposition of nickel. The bath parameters were as follows: operating temperature 45° C. to 50° C., 400 g of nickel sulphate heptahydrate per liter, 45 g of nickel chloride hexahydrate per liter, 45 g of boric acid per liter, anode nickel plates produced by Inco. An electroplating stand with right-angled frame of dimensions 380 mm by 400 mm, with a central web in which a 2.5 mm thick premetallized PP felt was conductively clamped was introduced into this electroplating bath. A diaphragm system was installed between the anode plates and the electroplating stand on both sides of the cathodic premetallized PP felt, which system had openings of approximately 60 mm over the entire height after one-quarter and three-quarters of the width. On both sides of the premetallized fibrous-structure felt web strip, the spacing of the diaphragm system, which is rigidly connected to the electroplating stand, is 40 mm. During the electrodeposition of metal, the electrolyte was in each case kept flowing on both sides of the diaphragm system using a conventional circulation pump. After conventional electrodeposition of on average 175 mg Ni/cm$^2$ of substrate area, a mass analysis carried out after removal of the electroplating electrolyte from the pores of the substrate revealed that in the regions of the diaphragm openings up to 250 mg Ni/cm$^2$ of substrate area had been deposited, while in the regions of the diaphragm shields only 100 mg Ni/cm$^2$ of substrate area had been deposited.

EXAMPLE 2

An electroplating bath was operated in a similar way to Example 1. However, in addition to the 60 mm wide openings, the diaphragm system also had 18 small openings, each with a diameter of 6 mm, to the left and right of the central web, which openings were in each case arranged in two rows, with a spacing of 20 mm over the height. After conventional electrodeposition of on average approximately 175 mg Ni/cm$^2$ of substrate area, a mass analysis carried out after the electroplating electrolyte had been removed from the pores of the substrate revealed that in the regions of the diaphragm openings up to 230 mg Ni/cm$^2$ of substrate area had been deposited, while in the regions of the diaphragm shields with the small scattered holes 130 mg Ni/cm$^2$ of substrate area had now been deposited.

One advantage of the invention is that it can be used to create metallized fibrous-structure electrode frameworks with a nickel level which varies gradually over the electrode height, with or without welded-on current discharge lug, for use in storage batteries. It also provides an inexpensive process for electroplating activated and metallized plastics substrates, in which metallized fibrous-structure electrode frameworks with a nickel level which varies gradually over the electrode height—by means of corresponding internals (diaphragms of particular design) in the electroplating tank—are formed in the electroplating process, without a reinforced edge which projects approximately up to at most 3 mm into the interior of the electrode framework.

As a result, the anodic nickel which was deposited in the previous reinforced edge in the form of dendrites can be dispensed with or can be additionally applied in other zones in which the nickel level was previously too low.

The fact that fibrous-structure electrode frameworks without dendrites are created means that these dendrites do not subsequently have to be removed in a dedicated operation (avoiding the formation of hazardous dusts which are harmful to health, saving working steps during production, saving costs, preserving natural resources). Also in the absence of such dendrites, they cannot, if not machined off, lead to disruptive short circuits when the cell is operating.

The particular design of the internal parts in the electroplating tank 24 (FIG. 1) means that only one premetallized fibrous-structure web 23 has to be inserted into stand frames, secured, removed following the electroplating process, centrifuged and washed. This web is then cut, stamped or divided in some other way, into identical fibrous-structure electrode framework plates over the height and over the width of the web. The result is a higher production yield of fibrous-structure framework electrodes which have been metallized and reinforced by electrodeposition per batch and per electroplating tank during manufacture, so that in the event of an increase in turnover, the investment costs which have to be incurred for new electroplating tanks are lower. In addition, inserting only one fibrous-structure framework strip requires less handling, working time and outlay on personnel and therefore also reduces the risk of errors during insertion compared to when the stand frames are fed with a plurality of fibrous-structure framework strips positioned at a distance above one another.

A controlled flow in the electroplating tank with a clear component directed onto the principal surface of the fibrous-structure framework strip during the electrodeposition ensures against excessive depletion of the concentration of nickel ions in the electrolyte in the interior in the pores of the framework, over the entire principal surface of the web. In addition, it also serves to eliminate altogether the scrap which occurs particularly with thick fibrous-structure framework webs with a nominal thickness of 3.5 mm or 4.5 mm on account of a sandwich-like design of the nickel-plated structure, in which only the outer layers have been nickel-plated correctly while in the interior the premetallized fibers have not been reinforced.

The creation of a fibrous-structure electrode framework which, for subsequent use in a storage battery, has a lower nickel level in its lower region than in its middle region and the highest nickel level in its upper region (i.e., in the zone in which it is subsequently welded to the current discharge lug), allows the framework to fulfil its functions of i) ensuring appropriate conductivity for the active compound over all regions of the electrode as seen over the height (in total), and ii) carrying the current with relatively low losses to the current discharge lug. It is therefore now possible to produce storage batteries with improved electrical properties, in particular cells which can be subjected to higher loads. Cells or batteries with fibrous-structure electrode frameworks of this type with welded-on current discharge lugs are operating, have a dischargeable capacity that is increased by approximately 5%, with the same amount of nickel employed for the electroplating of the premetallized fibrous-structure electrode framework web. Further advantages are a higher load-bearing capacity in the case of cells exposed to high loads, and a longer mean service life of the cells, since the active compound in the cell is utilized better and more uniformly.

The fact that the entire web, in those regions in which it is subsequently divided into the individual fibrous-structure electrode framework strips, is provided with a constant nickel level over a relatively large region of the web height means that, during the division, dimensionally accurate, straight end edges are always formed in the fibrous-structure framework blanks before the current discharge lug is welded on. In addition, it is also ensured that the upper edge and lower edge, and also the right-hand and left-hand edges, of the fibrous-structure electrode framework run parallel to one another and the upper and lower end edges run at right angles to the two side end edges. This simple possibility of producing dimensionally accurate fibrous-structure framework electrodes improves substantially the quality of the electrodes, and significantly facilitates cutting to the appropriate format. Also, it is no longer necessary for the structure web to be produced with a wide oversize at the wide sides and at the lower edge, as was previously necessary for safety in terms of manufacturing technology. At the same time, the electroplated oversize which was previously formed after the division, on one side of each individual single strip and on two sides on each double strip and was cut off after the current discharge lug had been welded on, is saved, since the entire web can now be cut in such a way that these oversizes are eliminated.

The quality is further improved by the fact that, in the upper region, a zone is provided which has a nickel level which is so high that the scrap involved with welding the fibrous-structure electrode frameworks to the current discharge lugs is reduced. The production according to the invention of a high nickel level over a zone (starting from the upper weld-on edge of the fibrous-structure framework) which is advantageously longer than the weld-on zone and is formed even in the interior over the thickness of the fibrous-structure electrode framework of this zone, compensates for the weakening of this zone caused by evaporation of the plastic cores of the nickel-plated fibers during the welding operation through the connection of the fibrous-structure electrode framework to the current connector lug, and balances it or even allows the strength to be considerably improved compared to the part art. When the current discharge lugs are welded onto correspondingly dimensioned, electroplated framework plates, the strength of the joint between the fibrous-structure framework plates and the current discharge lugs is increased by more than 30%.

The higher strength achieved between the fibrous-structure framework plates and the welded-on current discharge lugs means that there are fewer down times during the filling of the frameworks with paste. (For example, those which otherwise may occur when badly welded current discharge lugs have broken off the framework plates and first had to be removed again from the pasting vessel; or during the welding of the elements, when a badly welded current discharge lug has broken off the framework plate during the welding of the penultimate or last lug onto a strap of an element with 12 or 16 plates.)

During the production according to the invention of a fibrous-structure electrode framework with homogenous, rectilinear edge and a zone with a high nickel level in the region in which it overlaps the current discharge lug during the welding operation, from metallized plastics fibers with a welded-on, thick current discharge lug comprising teeth spaced apart from one another by teeth spaces, there is no cracking in the fibrous-structure electrode framework in the vicinity of the weld joint. Also, the fibrous-structure electrode framework does not have to be stamped in the welding region prior to the welding, and there exists, over all the partial sections of the weld length (sum of the teeth widths at the level of the weld line), a uniform pressure distribution during the welding and a uniform current distribution during the welding. Thus, contact regions are always identical, and are situated at regular intervals are created.

As a result, it is possible to produce weld joints using single-spot welding over a fibrous-structure electrode framework width of 200 mm, while the scrap rates during the welding operation are below 1% even for thin frameworks (1.5 mm nominal thickness). Therefore, the level of scrap caused by unusable frameworks which have been badly welded to a current discharge lug is reduced considerably. The weld joint between the fibrous-structure electrode framework according to the invention and the current discharge lug has a high strength not only in preferred welding regions but also in the edge zones, not only under tensile loads but also in the transverse direction. Therefore, it is possible to produce fibrous-structure electrodes with welded-on current discharge lugs with favorable electrical contact resistances and high service lives, so that they can be used not only in storage batteries in stationary installations, but also in industrial trucks or underground trains or similar applications under vibrating loads. The substantial reduction in the scrap rates during the production of the weld joint and the subsequent fabrication means that fewer quality assurance measures are required in the area of the electrode plate production, the impregnation, the welding of the plate stack and the cell assembly, leading to considerable savings on costs and manufacturing time.

A further advantage is that, due to the production of a high nickel level in the fibrous-structure electrode framework over the entire height, width and thickness of the fibrous-structure electrode framework and also, in particular, in the bottom region of the framework (the zone with the lowest nickel level in the fibrous-structure electrode framework), the strength of the framework is sufficiently high that it can withstand the pressure of the paste which exists in each case during the filling with a pasty, active compound, irrespective of the method which is used to introduce the active compound, such as vibratory shaking, rolling-in or pressing-in with simultaneous calibration of the framework. Thus, the paste penetrates into the pores without problems and with simultaneous displacement of the air therein.

Another important advantage of the invention is that, as a result of the production of homogeneous fibrous-structure electrode framework strips using electroplating which do not have a reinforced, dimensionally stable edge which is known from the prior art, it is now possible to anticipate the promising development and successful introduction of, for example, continuous manufacturing steps during the washing and drying of the framework strips as a whole following the electroplating.

Compared to the combination of advantages, saving on manufacturing times, reduction of scrap rates, increase in quality, saving on costs, preservation of natural resources and reduction of the recycling outlay, the increased outlay involved in designing and providing diaphragms in the electroplating is to be regarded as being negligibly low.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fibrous-structure framework web for fabricating a plurality of electrode plates which have current discharge lugs arranged exclusively on one edge, which web is electrolessly premetallized and reinforced by the electrodeposition of a metal, wherein:

an overall height of the fibrous-structure framework web corresponds to a multiple of heights of strips thereof from which fibrous-structure electrode framework plates are to be fabricated;

each strip height is equal to one electrode plate height;

each strip has a graduated metal thickness of electrodeposited metal, with three zones, including high, medium and low nickel levels; and thickness of the electrodeposited metal increases within the height of the strips, continuously towards the edge on which the current discharge lug is subsequently arranged.

2. A fibrous-structure framework web according to claim 1, wherein the metal is nickel.

3. The fibrous-structure framework web according to claim 1, wherein that the fibrous-structure framework web, over its height, is divisible into a plurality of strips, each strip having a height which corresponds to height dimensions of a format of one electrode plate.

4. The fibrous-structure framework web according to claim 1, wherein the individual strips have a profile of varying metal thickness over the height of the electrode plate.

5. The fibrous-structure framework web according to claim 3, wherein a zone with a high metal thickness of an uppermost strip within said web is in turn adjoined by a zone with a high metal thickness of a second uppermost strip.

6. The fibrous-structure framework web according to claim 5, wherein a zone with a low metal thickness of the second uppermost strip is in turn adjoined by a zone with a low metal thickness of a third uppermost strip.

7. The fibrous-structure framework web according to claim 1, wherein regions at which the web is to be divided into individual fibrous-structure framework strips has a metal thickness which changes not at all or only slightly in the height direction.

8. The fibrous-structure framework web according to claim 5, wherein an uppermost zone of the uppermost strip and a bottom zone of a lowermost strip have a low metal thickness.

9. Electrode plate made from a fibrous-structure framework web for fabricating a plurality of electrode plates which have current discharge lugs arranged exclusively on one edge, which web is electrolessly premetallized and reinforced by the electrodeposition of a metal, wherein:
- an overall height of the fibrous-structure framework web corresponds to a multiple of heights of strips thereof from which fibrous-structure electrode framework plates are to be fabricated;
- each strip height is equal to one electrode plate height;
- each strip has a graduated metal thickness of electrodeposited metal, with three zones, including high, medium and low nickel levels;
- thickness of the electrodeposited metal increases within the height of the strips, continuously towards the edge on which the current discharge lug is subsequently arranged;
- the electrode plate has a width of from 50 mm to 500 mm, a height of from 80 mm to 300 mm and a thickness of from 0.5 mm to 10 mm.

10. The electrode plate according to claim 9, wherein:
- said metal consists substantially of nickel; and
- the nickel thickness increases from a lower edge to an upper edge of the electrode plate, on which the current discharge lug is arranged.

11. The electrode plate according to claim 9, wherein a profile of metal thickness over the height of the electrode plate has three regions.

12. The electrode plate according to claim 11, wherein:
- in a first, lowest region, extending from the lower edge up to a height of from 10% to 40% of the electrode plate height, the metal thickness of the electrode plate is at a minimum and exhibits a progressive profile over the height of the first region.

13. The electrode plate according to claim 11, wherein the metal thickness of the electrode plate at the lower side is between 30 mg Ni/cm$^2$ and 100 mg Ni/cm$^2$.

14. The electrode plate according to claim 13, wherein the metal thickness at the low side is 50 Ni/cm$^2$.

15. The electrode plate according to claim 11, wherein, in a second, middle region that extends from a height of from 10% to 40% of the electrode plate height, measured from the lower edge, up to a height of from 60% to 90% of the electrode plate height measured from the lower edge, the metal thickness increases proportionally to increasing height of the middle region.

16. The electrode plate according to claim 11, wherein over the height of a third, upper region that extends from a height of from 60% to 90% of the electrode plate height, measured from the lower edge to the upper edge of the electrode plate, the metal thickness exhibits a regressive profile, and is at a maximum at an upper edge of the electrode plate.

17. The electrode plate according to claim 9, wherein the metal thickness of the electrode plate at an upper edge of the electrode plate is 150 mg Ni/cm$^2$ to 300 mg Ni/cm$^2$.

18. The electrode plate according to claim 17, wherein the metal thickness of the electrode plate at an upper edge of the electrode plate is 250 mg Ni/cm$^2$.

19. The electrode plate according to claim 9, wherein a connection between the current discharge lug and the electrode plate has a tensile strength of 480 N to 950 N for a tearing length of at least 1.5 mm to 3.2 mm, a free clamping length of the fibrous-structure framework of 10 mm during the test procedure and a specimen width of 35 mm.

20. The electrode plate according to claim 9, wherein the metal thickness at any selected height of the electrode plate, measured from the bottom edge, is approximately constant over the width of the electrode plate.

21. The electrode plate according to claim 20, wherein the metal thickness at said selected height of the electrode plate exhibits a maximum deviation from a mean metal thickness of ±5%.

22. The electrode plate according to claim 21, wherein the metal thickness of the electrode plate increases, within the predetermined tolerance, from the bottom edge upward.

23. The electrode plate according to claim 9, wherein a local metal thickness decreases in a thickness direction of the electrode plate into its interior by no more than 10% of the local metal thickness.

24. The electrode plate according to claim 9, wherein during a filling operation for positive electrodes, an active-compound paste is introduced, which:
- contains from 28 to 53% by volume nickel hydroxide;
- has a yield stress range of from 20 to 140 Pa;
- a plastic viscosity of from 0.05 to 1.3 Pas;
- the grain group at the solid particles in the paste having grain sizes of from 4 to 10 μm (at a screenings value D=63.21%);
- with a grindometer value of from 8 to 25 μm; and
- has a screenings value of 25% for a grain size of approximately 0.2 μm.

25. The electrode plate according to claim 24, wherein during a filling operation for negative electrodes, an active-compound paste is introduced, which:
- contains from 15 to 35% by volume cadmium oxide;
- in addition contains 7% by volume cadmium and 1% by volume nickel hydroxide;
- has a yield stress range of from 5 to 250 Pa; and
- has a plastic viscosity of from 0.05 to 3 Pas.

26. The electrode plate according to claim 9, wherein at least one dispersing agent is added to the active-compound paste.

27. The fibrous-structure framework web according to claim 1, wherein the fibrous-structure electrode framework used is nonwoven or needled-felt webs,
- having a web thickness of from 0.25 mm to 10 mm,
- having a porosity of the untreated web of from 50% to 98%,
- having a basis weight of the untreated web of from 50 g/m$^2$ to 800 g/m$^2$,
- the plastics fibers of the web having a diameter of from 0.4 dtex to 7.9 dtex,
- the plastics fibers having a length of between 15 mm and 80 mm,
- the plastics fibers being activated, chemically metallized and reinforced by electrodeposition with a layer of metal, and
- the fibrous-structure electrode framework having a nickel coating of on average between 25 mg Ni/cm$^2$ and 300 mg Ni/cm$^2$.

* * * * *